(12) United States Patent
Marlow et al.

(10) Patent No.: US 9,428,043 B2
(45) Date of Patent: Aug. 30, 2016

(54) LIQUID VAPOR SEPARATOR DRAIN VALVE

(71) Applicants: George J Marlow, Rochester Hills, MI (US); Darrin W Hurley, Flat Rock, MI (US)

(72) Inventors: George J Marlow, Rochester Hills, MI (US); Darrin W Hurley, Flat Rock, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/530,075

(22) Filed: Oct. 31, 2014

(65) Prior Publication Data

US 2015/0122347 A1    May 7, 2015

Related U.S. Application Data

(60) Provisional application No. 61/901,158, filed on Nov. 7, 2013.

(51) Int. Cl.
*F16K 24/00* (2006.01)
*B60K 15/035* (2006.01)
(Continued)

(52) U.S. Cl.
CPC ....... *B60K 15/03519* (2013.01); *B60K 15/035* (2013.01); *B60K 15/03504* (2013.01);
(Continued)

(58) Field of Classification Search
CPC .......... B60K 15/035; B60K 15/03519; B60K 2015/0344; B60K 2015/03046; B60K 15/03504; B60K 2015/03514; B60K 2015/03289; F02M 37/103; F02M 37/20; F02M 25/0836; F02M 25/0872; F02M 2025/0863; F16K 24/042; B29C 65/08; B29K 2059/00; B29L 2031/7172; B29L 2031/7496; Y10T 137/0874; Y10T 137/3099; Y10T 137/86324; Y10T 137/0486; Y10T 428/13; Y10T 137/3084; Y10T 137/7426; Y10T 137/6004; Y10T 137/3009; Y10T 137/3087; Y10T 137/0826; Y10T 137/0777; Y10T 137/053
USPC ....... 137/15.26, 315.08, 202, 430, 197, 198, 137/39, 41, 43, 587, 588
See application file for complete search history.

(56) References Cited

U.S. PATENT DOCUMENTS 5,497,800 A * 3/1996 Ohashi ............. B60K 15/03519
123/519
6,675,779 B2    1/2004 King et al.
(Continued)

FOREIGN PATENT DOCUMENTS

EP    0667253 A1    8/1995
EP    0790144 A2    8/1997
(Continued)

OTHER PUBLICATIONS

International Search Report and Written Opinion dated Feb. 11, 2015 for International Application No. PCT/US2014/064203, International Filing Date Nov. 6, 2014.

*Primary Examiner* — Craig J Price
(74) *Attorney, Agent, or Firm* — Ralph E. Smith

(57) ABSTRACT

A liquid vapor separator drain valve includes an outer housing defining upper and lower chambers separated by a divider. An upper housing coupled to the outer housing partitions the upper chamber into inner and outer chambers and defines an upper port for communication with a carbon canister. The outer housing defines an external port in communication with the outer chamber and for communicating with a fill limit valve. Upper and lower valves are positioned in the respective upper and lower chambers such that the valves and upper and lower chambers are arranged in a vertically stacked, concentric manner. The lower valve vents fuel vapor to the upper chamber in a rest position and seals a divider vent passage when liquid fuel reaches a lower threshold. The upper valve vents fuel vapor to the upper port and seals the upper port when liquid fuel reaches an upper threshold.

15 Claims, 7 Drawing Sheets

(51) Int. Cl.
*F02M 25/08* (2006.01)
*F16K 24/04* (2006.01)
*B60K 15/03* (2006.01)

(52) U.S. Cl.
CPC ........ *F02M25/0872* (2013.01); *F16K 24/042* (2013.01); *B60K 2015/03289* (2013.01); *B60K 2015/03514* (2013.01); *F02M 2025/0863* (2013.01); *Y10T 137/3084* (2015.04); *Y10T 137/3099* (2015.04); *Y10T 137/86324* (2015.04)

(56) References Cited

U.S. PATENT DOCUMENTS

| | | | | |
|---|---|---|---|---|
| 7,163,023 B2* | 1/2007 | Spink | ............... | F16K 24/044 137/15.26 |
| 7,275,556 B2 | 10/2007 | Frohwein | | |
| 8,042,523 B2* | 10/2011 | Lee | ............... | B60K 15/03519 123/516 |
| 8,689,816 B2* | 4/2014 | Pifer | ............... | F16K 24/044 123/518 |
| 2001/0011538 A1 | 8/2001 | Crary et al. | | |
| 2003/0094458 A1* | 5/2003 | Beyer | ............... | B60K 15/03519 220/562 |
| 2012/0298211 A1 | 11/2012 | Belanger | | |
| 2013/0153051 A1* | 6/2013 | Vulkan | ............... | B60K 15/03519 137/202 |
| 2014/0060665 A1* | 3/2014 | Gamble | ............... | B60K 15/03519 137/202 |

FOREIGN PATENT DOCUMENTS

| | | |
|---|---|---|
| EP | 1488947 A2 | 12/2004 |
| WO | 03035224 A1 | 5/2003 |
| WO | 2009/095780 A2 | 8/2009 |

\* cited by examiner

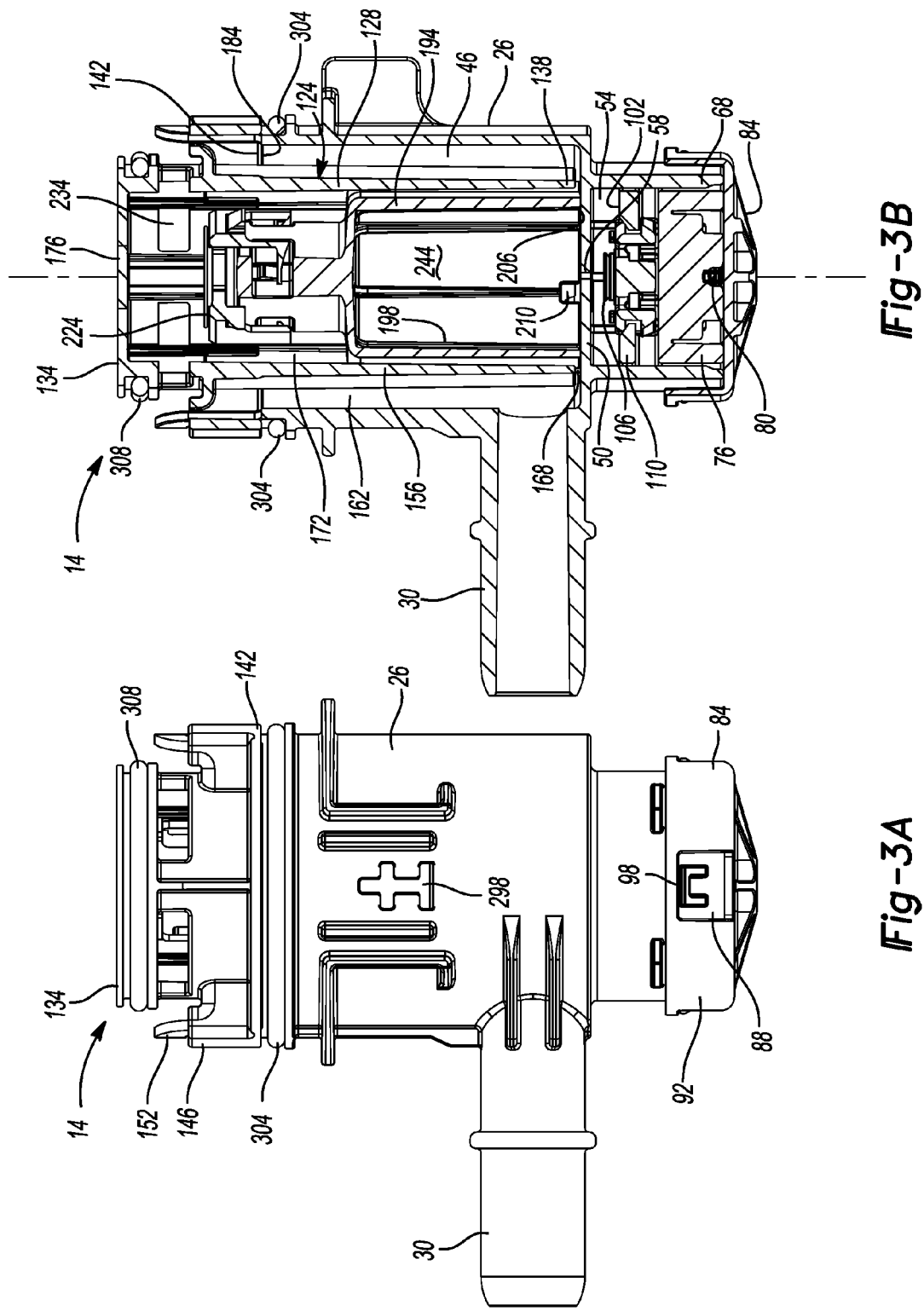

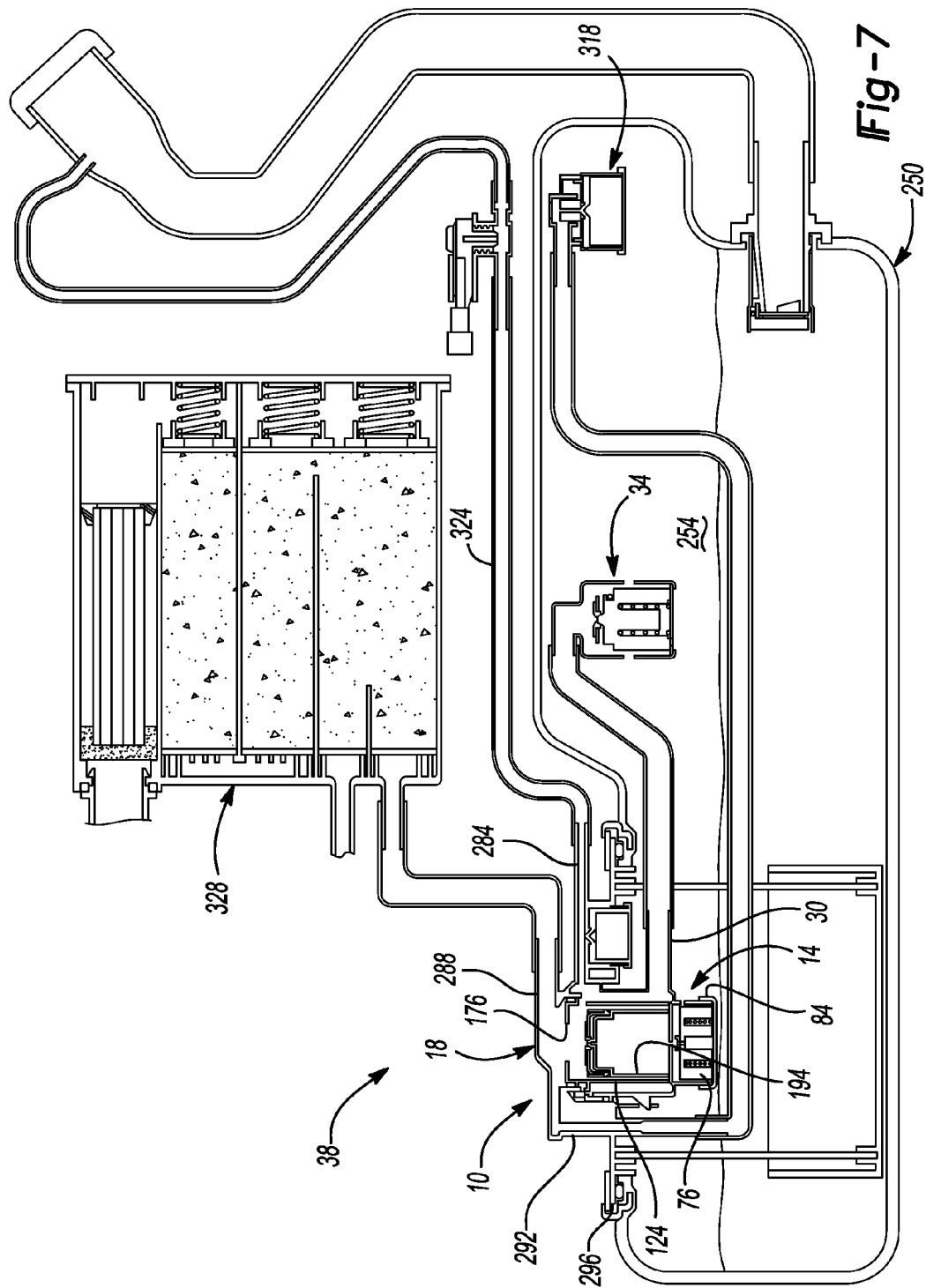

LIQUID VAPOR SEPARATOR DRAIN VALVE

CROSS-REFERENCE TO RELATED APPLICATIONS

This application claims benefit of U.S. Provisional Application Ser. No. 61/901,158 filed on Nov. 7, 2013. The disclosure of the above application is incorporated herein by reference in its entirety.

FIELD

This application relates generally to vapor vent systems for vehicle fuel systems and, more particularly, to a liquid vapor separator drain valve assembly for a fuel system of a motor vehicle.

BACKGROUND

Conventional fuel systems for motor vehicles typically include multiple vent valves for managing vapor flow from a fuel tank to a carbon canister associated with an evaporative emission system of the vehicle. These vent valves can be positioned remote from the fuel tank or can be positioned in and attached to the fuel tank. For the latter scenario, each vent valve is typically positioned in the fuel tank and attached thereto through separate openings, which are required to be sealed to prevent leakage of liquid fuel and/or fuel vapor. Examples of such vent valves for managing fuel vapor include a grade vent valve and a fill or fuel limit vapor valve. These separately positioned valves increase the possibility for potential leak paths and are typically attached to the fuel tank in such a manner that servicing and/or removal can be difficult. Further, these vent valves and their associated plumbing increase the cost and complexity of the vehicle fuel system. Thus, while conventional vent valve arrangements for motor vehicle fuel systems work for their intended purpose, there remains a need for improvement in the relevant art.

SUMMARY

In accordance with one aspect of the invention, a liquid vapor separator drain valve (LVSDV) assembly for a vehicle fuel tank is provided. In one exemplary implementation, the assembly includes a LVSDV that is adapted to be positioned in the fuel tank. The LVSDV includes an outer housing, an upper housing and upper and lower valves. The outer housing defines upper and lower chambers separated by a divider member having a vent passage. The upper housing is coupled to the outer housing and includes a body positioned in the upper chamber so as to partition the upper chamber into outer and inner chambers. The upper housing also defines an upper port adapted to be in communication with a carbon canister, and the outer housing also defines an external port in communication with the outer chamber and adapted to be in communication with a fill limit vapor valve. The upper and lower valves are movably positioned in the respective inner and outer chambers such that the upper and lower chambers and the upper and lower valves are positioned in a vertically stacked, concentric arrangement. The lower valve is operable to vent fuel vapor from the fuel tank to the upper chamber in a rest position and seal the vent passage when liquid fuel reaches a lower predetermined level. The upper valve is operable to vent fuel vapor to the upper port i) from the vent passage and ii) from the external port when the liquid fuel is above or below the lower predetermined level, and to seal off the upper port when the liquid fuel is above an upper predetermined level greater than the lower predetermined level.

In accordance with another aspect of the invention, the LVSDV assembly includes a flange housing adapted to be removably secured to the fuel tank. In one example implementation, the flange housing defines upper and lower vent ports and a receptacle for coupling the LVSDV thereto. The upper vent port extends from or adjacent to the receptacle and is in communication with the upper port and is adapted to be in communication with the carbon canister for venting fuel vapor from the LVSDV to the carbon canister. The lower vent port is in communication with the upper housing via the receptacle and is adapted to be in communication with a fuel filler tube recirculation line. In one example implementation, the upper vent port and the lower vent port are vertically and horizontally spaced apart from each other so as to be in direct communication with different chambers defined by the LVSDV upon coupling the LVSDV to the flange housing.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 3A is a side view of the LVSDV of FIG. 2 in accordance with the principles of the present disclosure;

FIG. 3B is a sectional view of the LVSDV of FIG. 3A in accordance with the principles of the present disclosure;

FIG. 7 is a schematic view of an exemplary evaporative system for a vehicle including the LVSDV assembly in accordance with the principles of the present disclosure.

DESCRIPTION

Figure 1:
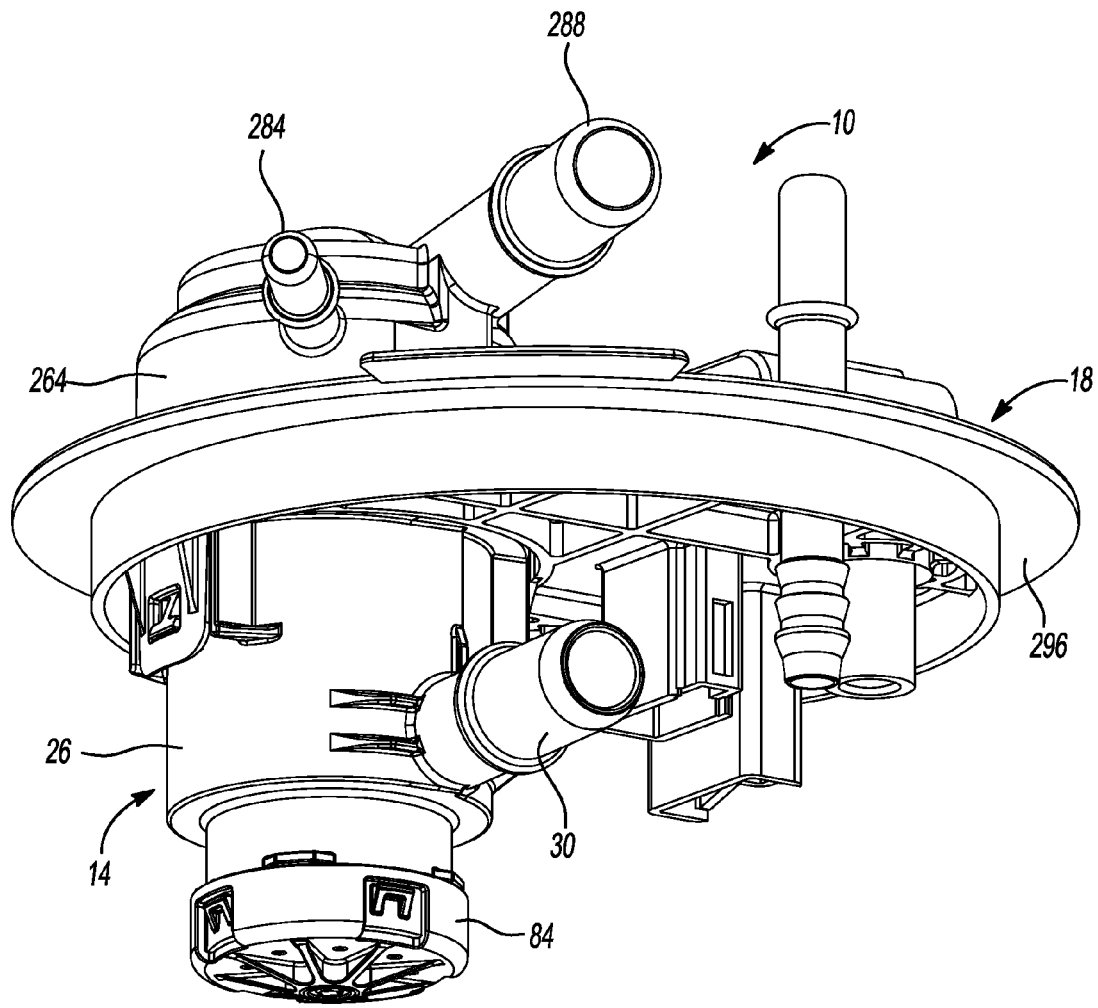
FIG. 1 is a perspective view of an exemplary liquid vapor separator drain valve (LVSDV) assembly in accordance with the principles of the present disclosure.

With initial reference to FIG. 1, an exemplary liquid vapor separator drain valve (LVSDV) assembly is shown and generally identified at reference numeral 10. In accordance with various aspects of the invention, the LVSDV assembly 10 includes a LVSDV 14 and a flange member or housing 18 that is removably sealingly coupled to a fuel tank (FIG. 7).

In this implementation, the flange member 18 is also configured to removably and sealingly receive the LVSDV 14 in a snap-fit configuration. As will be discussed in greater detail below, the LVSDV assembly 10 provides for allowing fuel vapor to vent to a carbon canister while protecting the carbon canister from liquid fuel. In one exemplary implementation, the LVSDV assembly 10 interfaces with a fuel delivery module and various fuel tank vent valves while the LVSDV 14 is packaged in the fuel tank.

In accordance with various aspects of the invention, the LVSDV assembly 10 is advantageously configured in a more compact and less complex manner thereby reducing cost and complexity of the vehicle fuel and evaporative systems while also reducing packaging space required within the fuel tank. This thereby provides for using a smaller fuel tank and/or positioning the LVSDV 14 in the fuel tank while allowing fuel to rise higher than with conventional larger and more bulky vent valves. By providing a single device (i.e., the LVSDV assembly 10) with multiple functions, less connections with the fuel tank are required and those connections are confined within the fuel tank via the LVSDV assembly 10, which reduces complexity and potential leak paths.

For example and as will be discussed in greater detail below, the fuel vapor vent valves are routed through the LVSDV assembly 10 such that the LVSDV 14 can capture any liquid carry over (LCO) and thereby protect a carbon canister from potential fuel contamination. The LVSDV assembly 10 is configured to coalesce LCO if present in the vapor venting lines of the evaporative and/or fuel systems. In addition, in one exemplary implementation, the LVSDV assembly 10 is configured to drain LCO with an integrated roll over drain valve, protect for a failed nozzle scenario, protect the evaporative system with a liquid trap design, and provide for venting with LCO in vapor venting lines and fuel in the liquid separation chamber.

Figure 2:
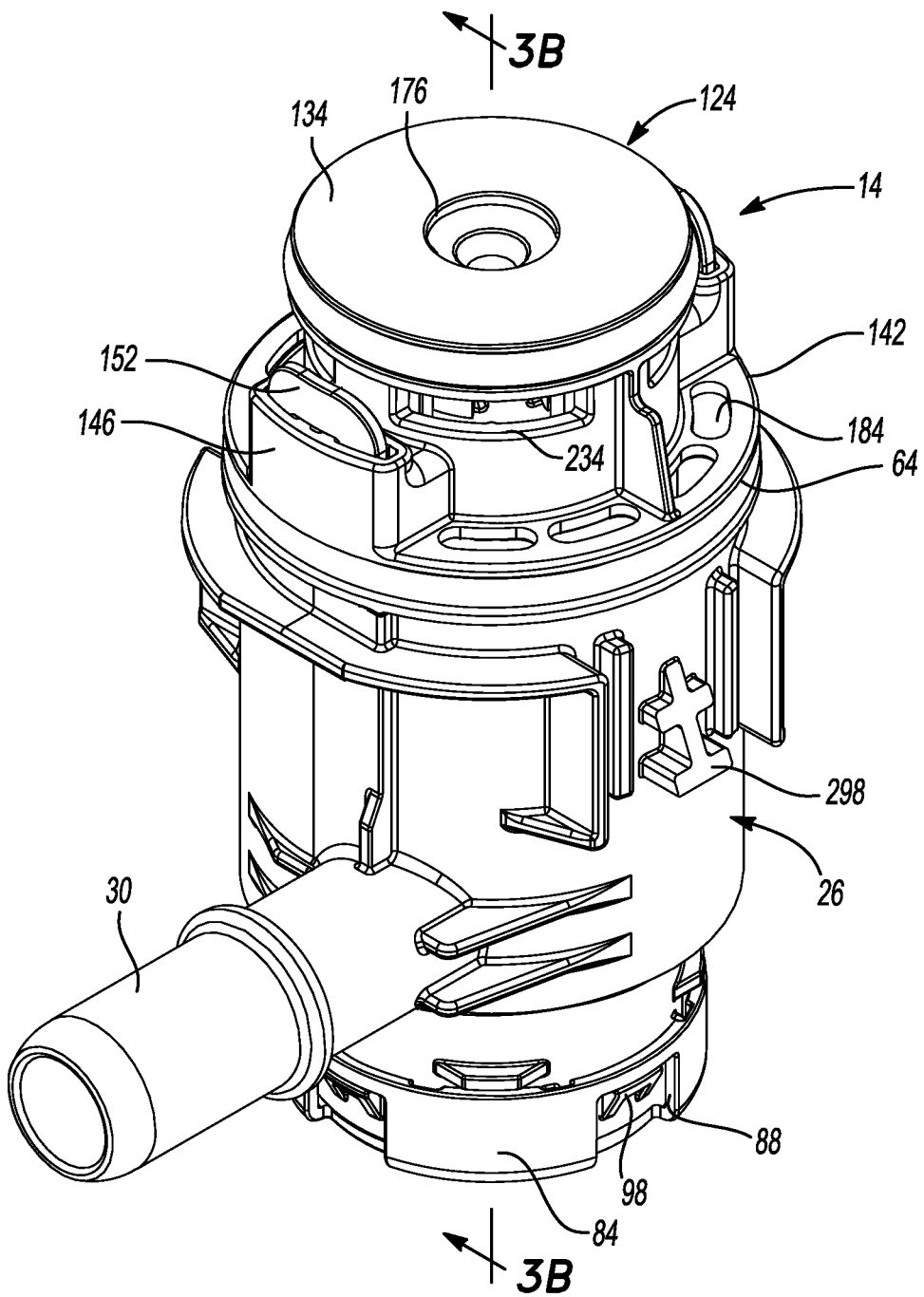
FIG. 2 is a perspective view of an exemplary liquid vapor separator drain valve of the LVSDV assembly of FIG. 1 in accordance with the principles of the present disclosure.

Continuing with reference to FIG. 1 and with additional reference to FIGS. 2-3B, the LVSDV 14 includes, in one exemplary implementation, an outer body or housing 26 defining an external port 30 configured to be fluidly coupled to a fill limit vapor valve (FLVV) 34 of an exemplary evaporative system 38 schematically shown in FIG. 7. The outer body 26 defines an upper internal chamber 46 separated by a divider member 50 from a lower internal chamber 54. The divider member 50 includes at least one passage 58 to provide selective fluid communication between the chambers 46, 54. The outer body 26 also defines an open upper end 64, which forms an open upper end of chamber 46, and a lower open end 68, which forms a lower open end of chamber 54. In the exemplary implementation illustrated, the housing 26 includes a cylindrical shape such that the upper and lower internal chambers 46, 54 are cylindrical in shape with the upper chamber 46 having a longer axial length than the lower chamber 54, as can be seen for example in FIGS. 3A-3B.

A lower valve 76 is movably positioned in the lower chamber 54 and, in one exemplary implementation, is balanced by a biasing member 80. In one exemplary implementation, the lower valve 76 is a float valve. A cap or closure member 84 is removably coupled to the lower end 68 of housing 26 so as to be positioned under the float 76. The cap 84 is configured to support and/or capture the float 76 in lower chamber 54. In one exemplary implementation, the cap 84 is perforated and is configured to be removably snap-fit to the outer body 26 via tabs or cutouts 88 formed in an outer rim 92 of cap 84 and corresponding angled projections 98 formed on outer body 26.

An upper end or side 102 of the float 76 includes a seal 106 configured to, when urged upward by liquid fuel, seal against the divider member 50 so as to block or seal passage 58 and thereby seal lower internal chamber 54 from upper internal chamber 46. The seal 106, in the exemplary implementation illustrated, includes a housing 110 movably coupled to the float 76 to provide an ability for the seal 106 to move relative to the float 76 in a situation where, for example, the liquid fuel urging the float 76 upward toward the divider member 50 provides an angled force on the float 76.

The LVSDV 14 includes an upper housing member 124 that is removably coupled to the outer housing 26, as shown for example in FIGS. 2A-3B. The upper housing member 124 includes a body 128 defining an upper end 134, a lower end 138 and a radially extending flange 142. The radially extending flange 142 defines two receptacles 146 configured to receive two tabs or projections 152 axially extending from the upper end 64 of outer housing 26 to removably couple the upper housing member 124 to the outer housing 26. When the upper housing member 124 is removably coupled to the outer housing 26, a portion 156 of the body 128 between the flange 142 and the lower end 138 is positioned inside the upper chamber 46 such that the lower end 138 engages or rests on the divider member 50. The body 128 includes a smaller diameter than upper internal chamber 46 so as to be spaced apart therefrom when positioned therein and form a chamber area 162 between the outer housing 26 and the body 128 of upper housing member 124. In one exemplary implementation, the upper housing member 124 partitions the upper chamber 46 into an outer chamber 162 between the outer housing 26 and the upper housing body 128 and an internal chamber area 172 inside the body 128.

The lower end 138 of upper housing member 124 includes one or more cut-outs or recesses 168 so as to form a fluid communication path between the outer chamber area 162 and the internal chamber area 172 inside cylindrical body 128 when upper housing member 124 is assembled to outer housing 26. The upper end 134 of housing member 124 defines a central opening or port 176 in communication with the internal chamber 172 defined by the body 128 of housing member 124. The radial extending flange 142 defines one or more peripheral apertures or passages 184 spaced radially outward from the port 176 and the body 128 and configured to be in fluid communication with outer chamber area or portion 162 when housing member 124 is assembled to outer body 26. A radially outer portion of the radially extending flange 142 engages the upper end 64 of housing 26 when the upper housing member 124 is assembled thereto.

An upper valve 194 is positioned inside upper housing member 124 in the internal chamber 172 and includes a body 198 defining an upper end 202 and a lower end 206 having cut-outs or recesses 210. In one exemplary implementation, the upper valve 194 is an upper float valve that is configured to engage or rest on divider member 50 via the lower end 206 when positioned in LVSDV 14. The upper end 202 includes a smaller width or diameter 214 than a lower portion 218 and includes a seal 224 movably coupled thereto, such that when the upper valve 194 is urged upward by liquid fuel, the seal 224 is configured to seal against the upper end 134 of housing member 124 thereby sealing or closing off port 176. In the exemplary implementation illustrated, the upper valve 194 includes a longitudinal length less than a corresponding longitudinal length of the upper housing 124, as can be seen, for example, in FIG. 3B. The upper housing member 124 can also define one or more peripheral passages 234 in the body 128 and above the flange 142 proximate the upper end 134. These passages 234 provide a fluid communication path through body 128 and ultimately to passage 58 of divider 50 via a space between the upper housing member 124 and upper float valve 194 regardless of a position of the upper float valve 194.

Figure 2A:
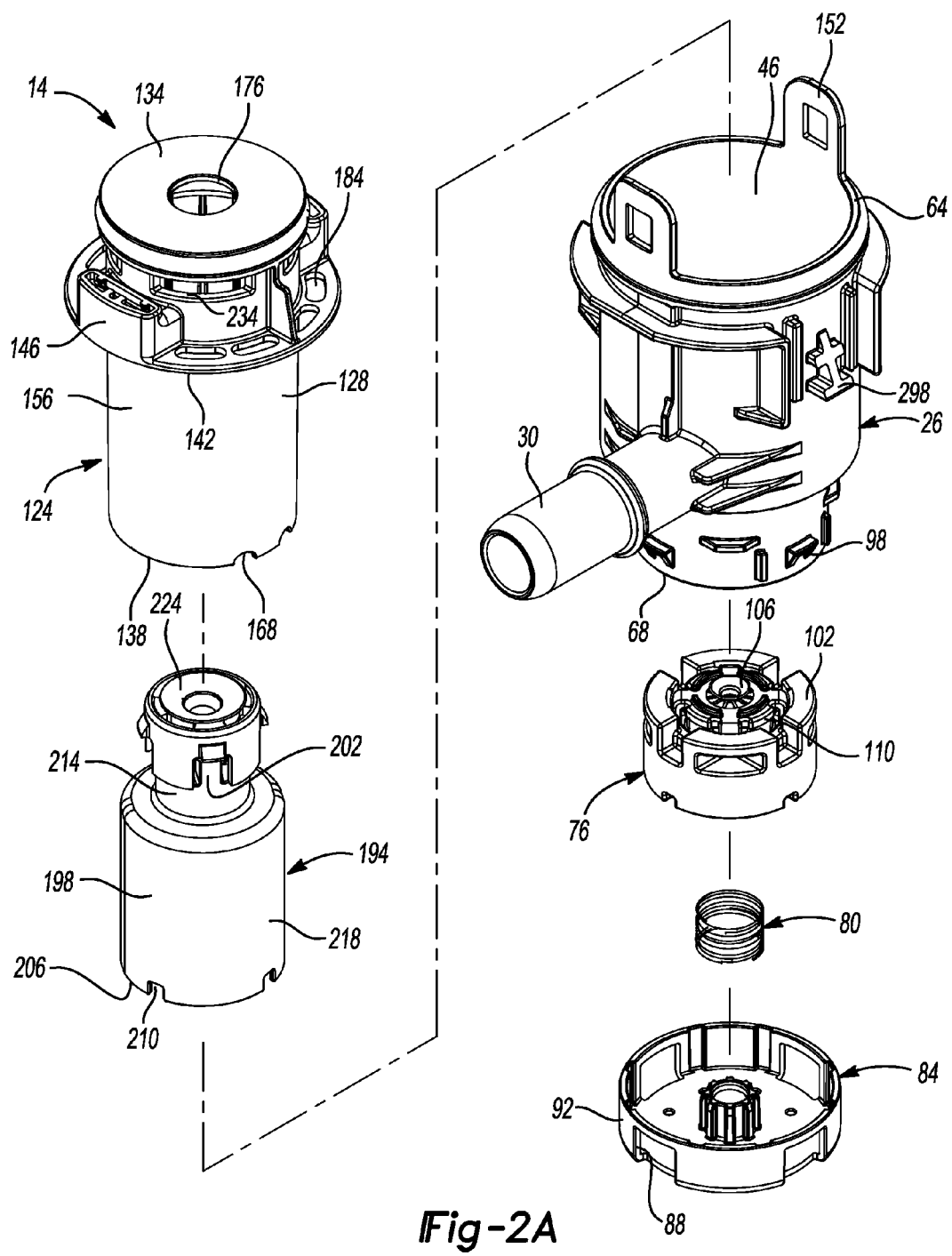
FIG. 2A is an exploded or assembly view of the LVSDV of FIG. 2 in accordance with the principles of the present disclosure.
Figure 4:
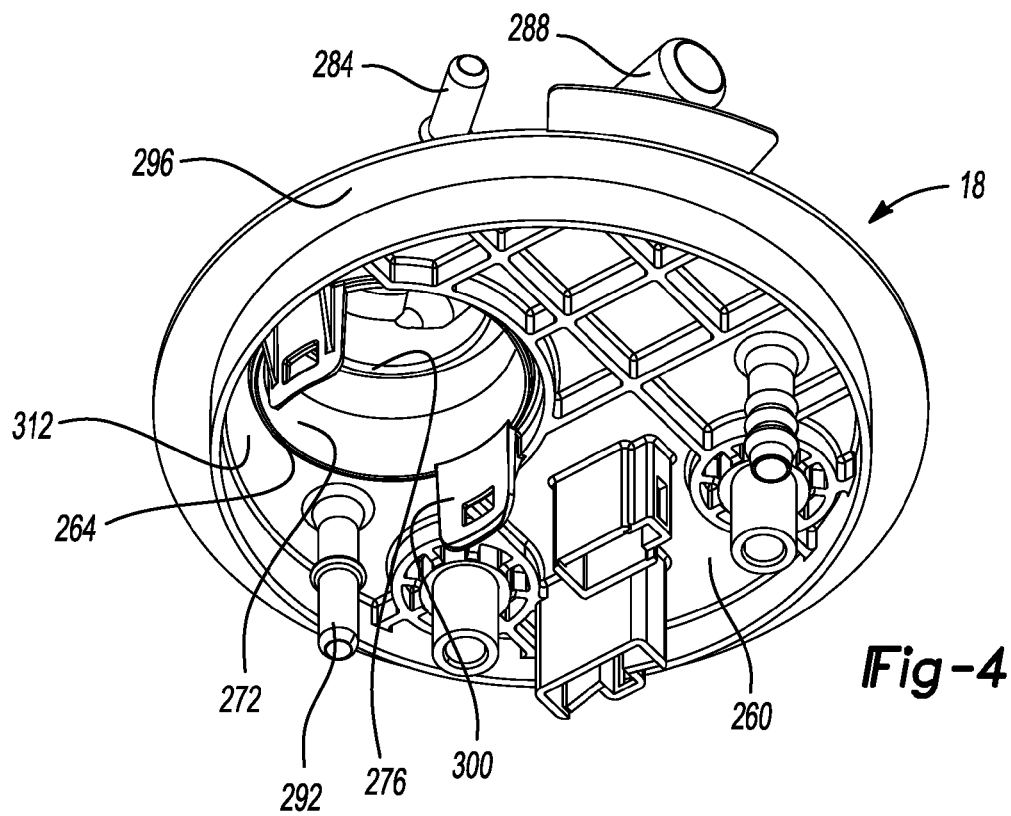
FIG. 4 is a bottom perspective view of a flange housing of the LVSDV assembly of FIG. 1 in accordance with the principles of the present disclosure.
Figure 5:
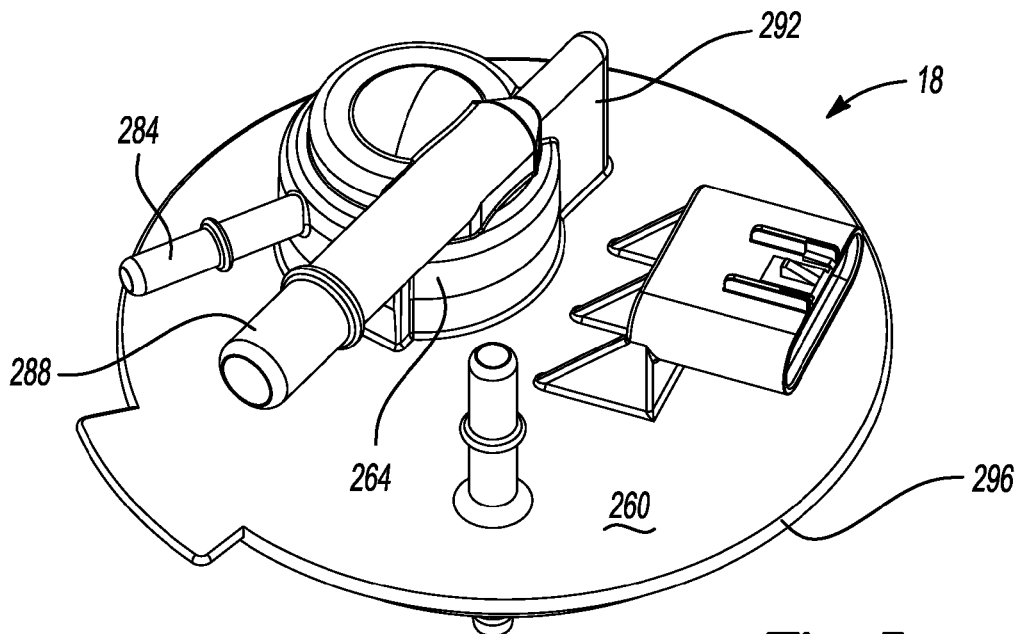
FIG. 5 is a top perspective view of the flange housing in accordance with the principles of the present disclosure.
Figure 6:
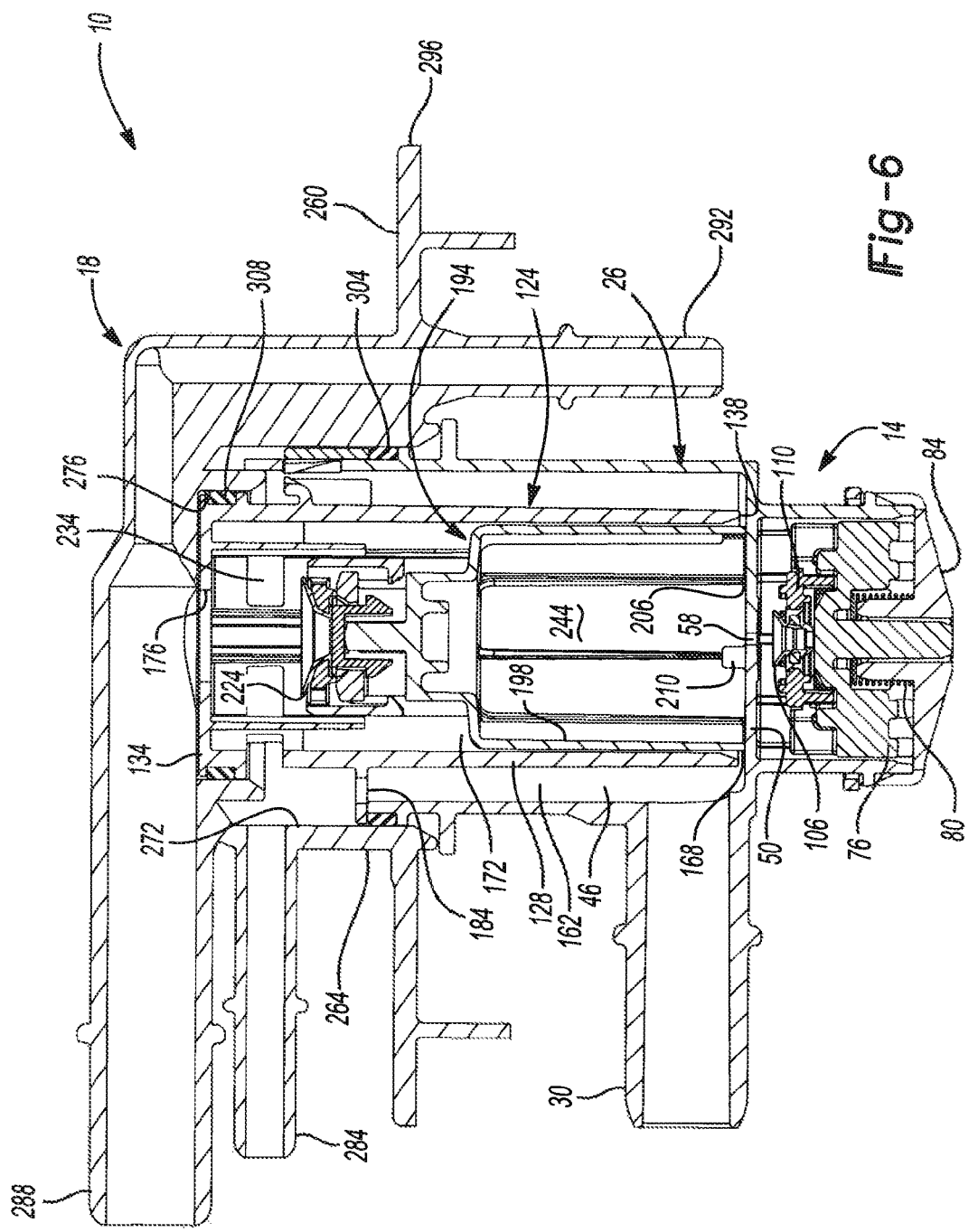
FIG. 6 is a sectional view of the LVSDV assembly in accordance with the principles of the present disclosure.

As can be seen in FIGS. 2A and 3B, the LVSDV 14 includes two in-line (i.e., common central axis), vertically stacked floats or float valves 76, 194 each having sealing capability associated with a respective upper end thereof. In other words, the upper and lower chambers are concentric and vertically or serially stacked and the upper and lower valves 76, 194 are concentric and vertically or serially stacked. In the exemplary implementation shown in the various figures, the upper float valve 194 includes a generally up-side-down U-shape configuration defining an internal chamber 244 having a diameter or width slightly smaller than the corresponding diameter or width of surrounding internal chamber 172. In a rest condition, float valve 194 is vertically spaced apart from the upper end 134 of upper housing member 124 and thus port 176. Fluid, such as fuel, entering chambers 162, 172 and 244 can urge upper float valve 194 upward into sealing engagement with the upper end 134 of housing member 24 thereby sealing off port 176 from the carbon canister.

With particular reference to FIGS. 4-7 and continuing reference to FIGS. 1-3B, the flange member or housing 18 will now be discussed in greater detail. As briefly mentioned above, the LVSDV 14 can be removably coupled to the flange member 18, which is sealingly connected to a fuel tank 250 and in fluid communication with an internal volume 254 defined thereby, as shown in FIG. 7. The flange member 18 includes a body 260 defining a raised receptacle or cavity 264 configured to receive the LVSDV 14. The receptacle 264 includes a first internal wall 272 and a second, smaller diameter internal wall 276. In one exemplary implementation, the second internal wall 276 is positioned above the first internal wall 272, which may be in or below the receptacle 264.

A first flange port 284 extends from and/or is in communication with an aperture or opening in the first wall 272 and a second flange port 288 extends from an area defined by or above the second internal wall 276. A third port 292 extends from a bottom of flange member 18 and is in communication with the first port 284. The first and second flange ports 284, 288 each extend from the receptacle 264 or adjacent body 260 while being fluidly coupled to different chambers when the flange member 18 is coupled to the LVSDV 14. In the exemplary implementation illustrated, the first and second flange ports 284, 288 extend in the same or substantially the same direction from body 260 and are vertically and horizontally spaced apart from each other. For example, the second flange port 288 is positioned above the first flange port 284. Such a configuration can provide for, among other advantages, a more compact flange member 18 for vehicle packaging purposes. The flange member body 260 also defines a perimeter flange area 296 for removable sealingly coupling the flange member 18 to the fuel tank 250, as shown for example in FIG. 7.

The LVSDV 14, when assembled together, includes a first seal 304, such as an o-ring, proximate an upper end of the outer body 26, and a second seal 308, such as an o-ring, proximate the upper end 134 of the upper housing member 124, as shown for example in FIG. 3B. The first and second seals 304, 308 are positioned in a stacked concentric relationship such that the second seal 308 is vertically and horizontally spaced apart from the first seal 304. With this sealing configuration, the LVSDV 14, when assembled to the flange member 18, automatically seals against the flange member 18 and automatically separates the LVSDV chambers associated with the first and second ports 284, 288.

For example, the first seal 304 seals to or against the first internal wall 272 and the second seal 308 seals to or against the second internal wall 276. This places, among other things, the first port 284 in communication with the outer chamber area 162 between outer body 26 and upper housing member 124 via peripheral passages 184; the second port 288 in communication with upper end port 176; and the third port 292 in communication with the second port 288 and upper end port 176. With this configuration, the upper valve 194 can seal off the upper port 176 and thus communication with the carbon canister via port 288 while allowing the first port 284 to communicate with the outer chamber area 162. In addition, the second port 288 can also communicate with the outer chamber area 162 and thus drain liquid fuel independent from the upper port 176 because the second port 288 is lower than the first port 284 and associated with the outer chamber 162. The LVSDV 14 is, in one exemplary implementation, removably coupled to the flange member 18 by guiding the upper end 134 of upper housing member 124 into the receptacle 264 such that tabs or projections 298 on an exterior of outer body 26 are received in a recess or cutout of projections 300 extending from a lower side or surface 312 of flange member 18.

Operation of the LVSDV 14 will now be discussed in conjunction with the flange member 18 and the exemplary evaporative system shown in FIG. 7. In one exemplary aspect, the third flange port 292 is fluidly coupled to a remote mounted grade vent valve 318, which is desirably positioned higher in the fuel tank 250 relative to the LVSDV 14. The first flange port 284 is fluidly coupled to the fuel fill tube recirculation line 324 and the second flange port 288 is fluidly coupled to the carbon canister 328. As mentioned above, the third flange port 292 is in communication with the second flange port 288 outside of and/or independent of the LVSDV 14. The LVSDV 14 external port 30 is in fluid communication with the fill limit vapor valve (FLVV) 34, which is positioned in the fuel tank 250.

In the exemplary implementation illustrated, the external port 30 is configured to provide a main vapor release path for the fuel tank system. In operating conditions where the float valves 76, 194 are in a rest or non-sealing position (e.g., not urged into a sealing position by liquid fuel), fuel vapor can flow into outer chamber or portion 162 of upper chamber 46 via external port 30 and flow through the flange peripheral passages 184, through radial wall passages 234 in upper housing member 124, through port 176, and out flange port 288 toward the carbon canister 328. Fuel vapor can also flow into chamber 172 of upper valve 124 via the perforated cap 84, lower internal chamber 54 and passage 58 in divider member 50.

If liquid fuel flows down the recirculation tube 324 and enters the LVSDV 14 via flange port 284, it can be diverted from a flow path toward the carbon canister 328 by the LVSDV assembly 10. More particularly, in the exemplary implementation illustrated, such liquid fuel flow from the recirculation tube 324 leaves flange port 284 and flows through peripheral flange passages 184 and into chamber portion 162, where the fuel can flow into the internal chamber 244 via the cut-outs 168, 210 in the lower ends 138, 206 of the housing member 124 and float valve 194, respectively. The liquid fuel then drains through passage 58 and the perforations in cap 84. If the volume of liquid fuel flowing into chamber 244 in the manner discussed above is greater than the drain rate, then the upper float valve 194 will be urged upward and seal off port 176 to protect the carbon canister 328. With port 176 sealed off, the liquid fuel from the recirculation tube 324 is not able to reach second flange port 288 and thus the carbon canister 328, but can still drain to the fuel tank.

If the vehicle is on a grade and the FLVV 34 would potentially leak or malfunction, the upper float valve 194 can act as a back-up to prevent liquid fuel from reaching the carbon canister 328. To the extent such a scenario would happen, fuel entering the FLVV 34 could potentially reach the LVSDV 14 via external port 30. In this situation, the liquid fuel would enter chamber 244 via the cut-outs and, to the extent the fuel enters at a rate greater than it drains, seal 224 would be urged against upper end 134 via float 194 to seal off port 58. This would again, in a similar manner as discussed above, prevent such fuel from reaching the carbon canister 328.

In a potential scenario where the LVSDV 14 and FLVV 34 are submerged in liquid fuel, to the extent possible without a roll-over condition, the LVSDV 14 would seal off any potential for liquid fuel to enter the carbon canister 328 via the LVSDV 14, while the remote grade vent valve 318 would provide for venting of the fuel tank 250 vapor to the carbon canister 328. While the float valves 76, 194 seal off passages/ports 58 and 176 of the LVSDV 14, the remote grade vent valve 318 is positioned and plumbed to the LVSDV 14 via third flange port 292 such that the fuel tank would still be able to vent fuel vapor via the third flange port 292 and second flange port 288. In this regard, and as can be seen in FIG. 7, the remote grade vent valve 318 is positioned at or substantially at an opposite side of the fuel tank 250 as the LVSDV 14, and mounted higher (toward a top of fuel tank 250).

It will be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A liquid vapor separator drain valve assembly for a fuel tank of a vehicle, comprising:
    a liquid vapor separator drain valve adapted to be positioned in the fuel tank, the liquid vapor separator drain valve including:
        an outer housing defining upper and lower chambers separated by a divider member having a vent passage;
        an upper housing coupled to the outer housing and having a body positioned in the upper chamber thereby partitioning the upper chamber into an outer chamber and an inner chamber, the upper housing defining an upper port adapted to be in communication with a carbon canister, the outer housing defining an external port in communication with the outer chamber and adapted to be in communication with a fill limit vapor valve; and
        a lower valve movably positioned in the lower chamber and an upper valve movably positioned in the inner chamber, wherein the upper and lower chambers and the upper and lower valves are positioned in a vertically stacked, concentric arrangement;
    wherein the lower valve is operable to vent fuel vapor from the fuel tank to the upper chamber in a rest position and seal off the vent passage when liquid fuel reaches a lower predetermined level, and the upper valve is operable to vent fuel vapor to the upper port i) from the vent passage and ii) from the external port when liquid fuel is above or below the lower predetermined level, and to seal off the upper port when liquid fuel is above an upper predetermined level greater than the lower predetermined level.

2. The valve assembly of claim 1, further comprising a flange housing adapted to be removably secured to the fuel tank, the flange housing defining a receptacle for coupling the liquid vapor separator drain valve to the flange housing.

3. The valve assembly of claim 2, wherein the flange housing further comprises:
    an upper vent port extending from the receptacle and in communication with the upper port and adapted to be in communication with the carbon canister for venting fuel vapor from the liquid vapor separator drain valve to the carbon canister; and
    a lower vent port in communication with the upper housing and adapted to be in communication with a fuel filler tube recirculation line.

4. The valve assembly of claim 3, wherein the upper vent port and the lower vent port are vertically and horizontally spaced apart from each other so as to be in direct communication with different chambers defined by the liquid vapor separator drain valve upon coupling the liquid vapor separator drain valve to the flange housing.

5. The valve assembly of claim 4, wherein the outer housing defines an outer housing diameter larger than an upper housing diameter defined by the upper housing; and
    wherein the outer housing includes an outer housing seal positioned proximate an upper end of the outer housing, and the upper housing includes an upper housing seal positioned proximate an upper end of the upper housing, the outer housing seal positioned vertically and horizontally spaced apart from the upper housing seal.

6. The valve assembly of claim 5, wherein upon coupling the liquid vapor separator drain valve to the flange housing, the outer and upper housing seals each engage the receptacle thereby placing the upper vent port in direct communication with the upper port and inner chamber and the lower vent port in direct communication with the outer chamber.

7. The valve assembly of claim 6, wherein the receptacle defines an inner wall and an outer wall, the inner wall being positioned between the upper and lower vent ports and having a smaller diameter than the outer wall, which is positioned at or below the lower vent port; and
    wherein upon coupling the liquid vapor separator drain valve to the flange housing, the upper housing seal engages the inner wall and the outer housing seal engages the outer wall.

8. The valve assembly of claim 1, wherein the lower valve comprises a float valve and a seal movably coupled to the float valve and configured to seal off the vent passage when liquid fuel reaches the lower predetermined level.

9. The valve assembly of claim 1, wherein the upper valve is positioned inside the body of the upper housing and includes a longitudinal length less than a corresponding longitudinal length of the upper housing.

10. The valve assembly of claim 9, wherein the upper valve comprises a float valve including:
    a cylindrical body defining an internal chamber and an open lower end configured to engage the divider member in a rest position; and an upper valve seal positioned on an upper end of the cylindrical body opposite the lower end of the cylindrical body;

wherein when liquid fuel fills the internal chamber, the upper valve is configured to move from the rest position such that the upper valve seal engages and seals off the upper port.

11. The valve assembly of claim 1, wherein the upper housing includes an upper housing diameter smaller than an outer housing diameter of the outer housing; and wherein the upper housing includes a radially extending flange configured to extend to and engage an upper end of the outer housing upon coupling the outer housing to the upper housing.

12. The valve assembly of claim 11, wherein the radially extending flange includes one or more flange apertures in communication with the outer chamber thereby providing a flow path for liquid fuel entering the lower vent port to flow through the one or more flange apertures and into the outer chamber.

13. The valve assembly of claim 12, wherein the body of the upper housing defines one or more body apertures positioned between the upper port and the radially extending flange, the one or more body apertures being in communication with the inner chamber; and wherein the liquid vapor separator drain valve provides a fuel vapor release path from the external port to the upper port such that the fuel vapor entering the external port flows into the outer chamber, through one or more flange apertures of the radially extending flange, through the one or more body apertures of the upper housing and through the upper port.

14. The valve assembly of claim 3, further comprising a third vent port extending from the receptacle and in communication with the upper port and adapted to be in communication with a grade vent valve positioned in the fuel tank.

15. The valve assembly of claim 14, wherein the third vent port extends from the receptacle at a position above the upper port when the liquid vapor separator drain valve is coupled to the flange housing and provides a vent path for fuel vapor when the lower valve seals off the vent passage and the upper valve seals off the upper port.

* * * * *